US011320809B2

(12) United States Patent
Fang et al.

(10) Patent No.: US 11,320,809 B2
(45) Date of Patent: May 3, 2022

(54) FACTORY MANAGEMENT SYSTEM AND CONTROL SYSTEM

(71) Applicant: Grade Upon Technology Corporation, Hsinchu County (TW)

(72) Inventors: Tai-Yu Fang, Hsinchu County (TW); Shu-Ling Chang, Taoyuan (TW); Wei Chang, Hsinchu (TW)

(73) Assignee: Grade Upon Technology Corporation, Hsinchu County (TW)

( * ) Notice: Subject to any disclaimer, the term of this patent is extended or adjusted under 35 U.S.C. 154(b) by 97 days.

(21) Appl. No.: 16/862,548

(22) Filed: Apr. 29, 2020

(65) Prior Publication Data

US 2021/0034041 A1 Feb. 4, 2021

Related U.S. Application Data

(60) Provisional application No. 62/880,672, filed on Jul. 31, 2019, provisional application No. 62/890,586, filed on Aug. 22, 2019.

(30) Foreign Application Priority Data

Dec. 20, 2019 (TW) .................................. 108146831

(51) Int. Cl.
 *G05B 19/418* (2006.01)
 *G05B 13/02* (2006.01)
(52) U.S. Cl.
 CPC ..... *G05B 19/4184* (2013.01); *G05B 13/0265* (2013.01); *G05B 2219/31439* (2013.01); *G05B 2219/36542* (2013.01)
(58) Field of Classification Search
 CPC ............ G05B 19/4184; G05B 13/0265; G05B 2219/31439; G05B 2219/36542; Y02P 90/02
 See application file for complete search history.

(56) References Cited

U.S. PATENT DOCUMENTS 6,263,255 B1 7/2001 Tan et al.
2016/0055045 A1 2/2016 Souza
(Continued)

FOREIGN PATENT DOCUMENTS

CN 109073089 12/2018
CN 109783262 5/2019
(Continued)

OTHER PUBLICATIONS

"Office Action of Taiwan Counterpart Application", dated Nov. 17, 2020, p. 1-p. 7.

*Primary Examiner* — Charles R Kasenge
(74) *Attorney, Agent, or Firm* — JCIPRNET

(57) ABSTRACT

A factory management system and control system are provided. The factory management system includes: a machine; multiple sensors disposed corresponding to the machine and generates multiple first sensing data; a server; and a control system coupled to the machine and the server. The control system receives the first sensing data to generate multiple corresponding control commands in real time and transmits the control commands to the machine. The control system receives a user login message and receives multiple second sensing data and displays the second sensing data in a user login status. The control system receives a user control command and transmits a second control command corresponding to the user control command to the machine. When the control system determines that an abnormal condition occurs according to the second sensing data in the user login status, the control system sends a warning message.

23 Claims, 7 Drawing Sheets

(56) References Cited

U.S. PATENT DOCUMENTS

2019/0087554 A1    3/2019  Fish et al.
2019/0108747 A1*   4/2019  Stenning .............. G08B 21/187

FOREIGN PATENT DOCUMENTS

| | | |
|---|---|---|
| CN | 109857026 | 6/2019 |
| JP | 2003067519 | 3/2003 |
| TW | 230349 | 4/2005 |
| TW | 201113657 | 4/2011 |
| TW | 201250634 | 12/2012 |
| TW | I646846 | 1/2019 |
| TW | 201921203 | 6/2019 |
| TW | I665560 | 7/2019 |

* cited by examiner

FACTORY MANAGEMENT SYSTEM AND CONTROL SYSTEM

CROSS-REFERENCE TO RELATED APPLICATION

This application claims the priority benefits of U.S. provisional application Ser. No. 62/880,672, filed on Jul. 31, 2019, U.S. provisional application Ser. No. 62/890,586, filed on Aug. 22, 2019, and Taiwan application serial no. 108146831, filed on Dec. 20, 2019. The entirety of each of the above-mentioned patent applications is hereby incorporated by reference herein and made a part of this specification.

BACKGROUND

Technical Field

This disclosure relates to a factory management system and a control system, and in particular to a factory management system and a control system which can be operated manually and automatically.

Description of Related Art

In the Industry 4.0 era, factory machines are typically equipped with sensors to collect big data and make real-time adjustments on production instructions to production machines based on the real-time calculations of artificial intelligence servers in factories. However, when the production process is abnormal and personnel are involved for fixing the abnormality, the transmission of production instructions and production status will be forced to be interrupted, and the sensing data of the sensor will be of no value for reference.

SUMMARY

In view of the above, this disclosure provides a factory management system and a control system, so that the factory management system can be operated manually and automatically.

This disclosure provides a factory management system, including: a machine; multiple sensors disposed corresponding to the machine and generates multiple first sensing data; a server; and a control system coupled to the machine and the server. The control system receives the first sensing data to generate multiple corresponding first control commands in real time and transmits the first control commands to the machine. The control system receives a user login message and receives multiple second sensing data and displays the second sensing data in a user login status. The control system receives a user control command and transmits a second control command corresponding to the user control command to the machine. When the control system determines that an abnormal condition occurs according to the second sensing data in the user login status, the control system sends a warning message.

This disclosure provides a control system, which is coupled to a machine and a server. The control system includes an artificial intelligence module. The artificial intelligence module receives the first sensing data to generate multiple corresponding first control commands in real time and transmits the first control commands to the machine. The artificial intelligence module receives a user login message and receives multiple second sensing data and displays the second sensing data in a user login status. The artificial intelligence module receives a user control command and transmits a second control command corresponding to the user control command to the machine. When the artificial intelligence module determines that an abnormal condition occurs according to the second sensing data in the user login status, the artificial intelligence module sends a warning message.

Based on the above, the factory management system and control system in the disclosure can continuously receive the second sensing data when the user logs in to the control system to allow the user to transmit a user command. If the control system determines that an abnormal condition has occurred in the user login status, the control system will also send a warning message. Therefore, the factory management system and control system in this disclosure will not interrupt the production process and the transmission of related data when the user logs into the control system, which will greatly improve the flexibility and efficiency of the factory automation management system.

In order to make the above-mentioned features and advantages of this disclosure more comprehensible, the following embodiments are described in detail with the accompanying drawings as follows.

DESCRIPTION OF THE EMBODIMENTS

Figure 1:
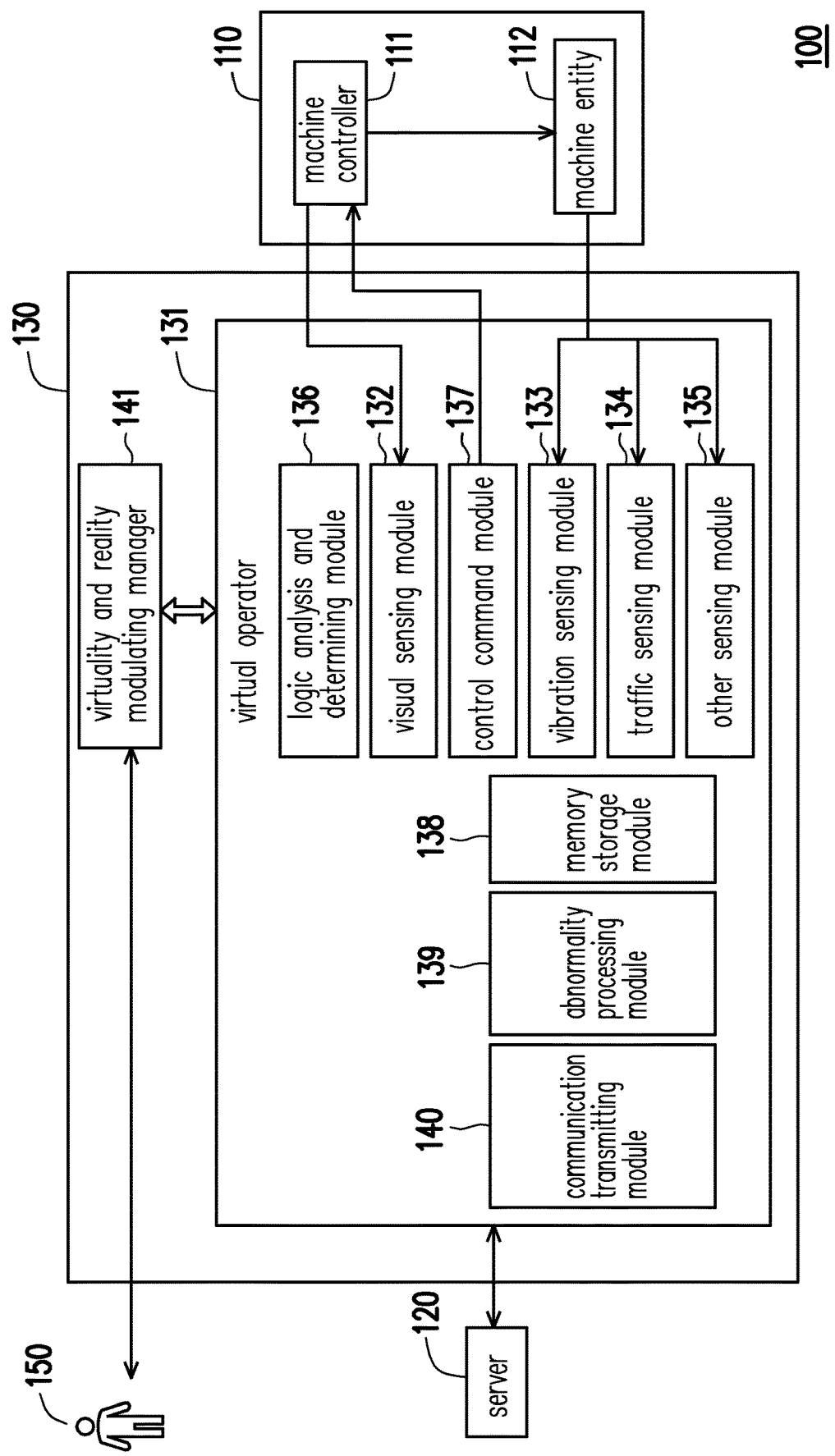
FIG. 1 is a block diagram of a factory management system according to an embodiment of the disclosure.

FIG. 1 is a block diagram of a factory management system according to an embodiment of the disclosure.

Please refer to FIG. 1, in an embodiment of the present disclosure, a factory management system 100 includes a machine 110, a server 120, and a control system 130. The control system 130 is coupled to the machine 110 and the server 120. The machine 110 includes a machine controller 111 to control a machine entity 112. The server 120 is, for example, a factory artificial intelligence server. The control system 130 includes a virtual operator 130 (also called an artificial intelligence module) and a virtuality and reality modulating manager 141. The virtual operator 130 can execute the automatic control program of the machine 110 and receive the production-related information of the machine, and transmit the production-related information to the server 120. The physical management personnel 150 can communicate with the virtual operator 131 through the virtuality and reality modulating manager 141 to control the machine 110.

In an embodiment, at least one of the visual sensing module 132, the vibration sensing module 133, the traffic sensing module 134 and other sensing module 135 of the control system 130 receives the first sensing data of the machine 110. A logic analysis and determining module 136 makes a judgment to generate multiple corresponding first control commands in real time, and a command control module 137 transmits the first control commands to a machine controller 111 of the machine 110. The server 120 may transmit an algorithm to the virtual operator 131 of the control system 130, and the virtual operator 131 of the control system 130 generates the first control commands according to the first sensing data and the algorithm. The virtuality and reality modulating manager 141 of the control system 130 receives a user login message of the physical management personnel 150, and receives multiple second sensing data (i.e., the virtual operator 131 will not stop working when the physical management personnel 150 intervenes) and displays the second sensing data in the user login status for the reference of the physical management personnel 150. The virtual operator 131 of the control system 130 receives the user control command, and the control command module 137 converts the user control command into a second control command readable by the machine controller 111, and transmits the second control command corresponding to the user control command to the machine 110. When the virtual operator 131 of the control system 130 determines that an abnormal condition occurs according to the second sensing data in the user login status, the virtual operator 131 of the control system 130 sends a warning message.

It should be noted that multiple sensors may be disposed corresponding to the machine 110 (for example, disposed in front of the machine, behind the machine and/or inside the machine) and generate multiple first sensing data and the second sensing data. The first sensing data and the second sensing data include at least one of image sensing data, pressure sensing data, temperature sensing data, flow sensing data, gas concentration sensing data, gas detection sensing data, and any other type of sensing data for production process.

In an embodiment, the virtuality and reality modulating manager 141 of the control system 130 determines the user authority of the corresponding user login message, and determines the maximum risk value of the corresponding user authority according to an authority and risk look-up table. When the risk value corresponding to the user control command is not greater than the maximum risk value, the control system 130 transmits the second control command corresponding to the user control command to the machine. The virtuality and reality modulating manager 141 may include one or more sets of keys, buttons and light signals. When the physical management personnel 150 is involved in the operation, the virtual operator 131 can be informed through pressing a button. The virtual operator 131 can also let the physical management personnel 150 know whether the current control authority belongs to the physical management personnel 150 or the virtual operator 131 by turning on or blinking the light signal. The virtuality and reality modulating manager 141 may also include a radio frequency identification (RFID) reader. When the physical management personnel 150 is involved in the operation, the RFID card of the physical management personnel 150 is read, and whether the physical management personnel 150 has the operation authority and the authority level thereof are determined according to the identification code on the RFID card. The virtuality and reality modulating manager 141 can further include a keyboard, a monitor, a touch screen and other output devices. When the physical management personnel 150 wants to intervene in the operation, he/she can enter the ID number and password, and the screen can display a light signal or other indicating methods can be used to let the physical management personnel 150 know whether the current control authority belongs to the physical management personnel 150 or the virtual operator 131. The virtuality and reality modulating manager 141 can also determine the authority level of the physical management personnel 150 through the ID number and password.

In an embodiment, an image sensor disposed corresponding to the machine 110 can capture the production image of the machine 110 and convert the production image into image data through the visual sensing module 132. The image data can be transmitted to the logic analysis and determining module 136. Similarly, the vibration sensing module 133, the traffic sensing module 134, and other sensing module 135 can also transmit vibration sensing data, traffic sensing data, and/or other sensing data to the logic analysis and determining module 136. The logic analysis and determining module 136 can make a corresponding control decision by using the collected image data and the sensing data according to the pre-established logic analysis and determining method and transmit the control decision to the control command module 137 to be converted into a control command, and transmit the control command to the machine controller 111. The image data and the sensing data can be stored in a memory storage module 138, and the logic analysis and determining module 136 can also retrieve the data from the memory storage module 138 to assist in making the judgment. The control commands can include input signals inputted through a keyboard, a mouse, a touch, a trackball and other means. The analyzing and determining principles (e.g., analysis algorithm) of the logic analysis and determining module 136 may be transmitted by the server 120 to the virtual operator 131 via a communication transmitting module 140 and stored in the memory storage module 138. The analyzing and determining principles can have priority and can be updated. The data in the memory storage module 138 can also be transmitted to the server 120 through the communication transmitting module 140 for big data analysis and machine learning, and the analyzing and determining principles are optimized for the next iteration. When the logic analysis and determining module 136 determines the occurrence of an abnormal condition through the image data and/or the sensing data, the logic analysis and determining module 136 can send a message through an abnormality processing module 139. The message can include a warning light signal, alarms, emails, text messages, mobile app push messages, etc.

In an embodiment, the physical management personnel 150 can perform collaborative operations with the virtual operator 131 through the virtuality and reality modulating manager 141. The virtual operator 131 can provide the sensing data to the physical management personnel 150 for the physical management personnel 150 to perform artificial logic analysis and judgment, and transmit the artificial control decisions to the machine 110 through the control command module 137. Although the authority level of the virtual operator 131 is lower than that of the physical management personnel 150 when the physical management personnel 150 intervenes in the operation, the logic analysis and determining module 136 still performs logic analysis and judgment in the background. Although the virtual operator 131 does not issue a control decision to the control command module 137 under the circumstances, when the virtual operator 131 determines that an abnormal condition has occurred, the virtual operator 131 can alert the physical management personnel 150 through the abnormality processing module 139. The operation records of the physical management personnel 150 can be stored in the memory storage module 138, and the data received or generated by the virtual operator 131 when the physical management personnel 150 intervenes in the operation will also be transmitted to the server 120 through the communication transmitting module 140.

In an embodiment, the control system 130 receives the third sensing data from the first sensor, divides the third sensing data into multiple data segments, and calculates a single value (for example, average value, maximum value, minimum value, or peak frequency, etc.) corresponding to each data segment. If the deviation of a single value is greater than the threshold value, the control system 130 sends a first warning message. For example, when the sampling frequency of the third sensing data is 50 Hz, each data segment may include 50 sampling values, and the control system 130 may calculate a single value (average value, maximum value, etc.) corresponding to the 50 sampling values of each data segment, and determine whether the deviation of the single value of each data segment is excessively large and sends a warning message. It should be noted that the waveform of the sensing data can be subjected to logarithmic calculation and then divided into data segments.

Figure 2:
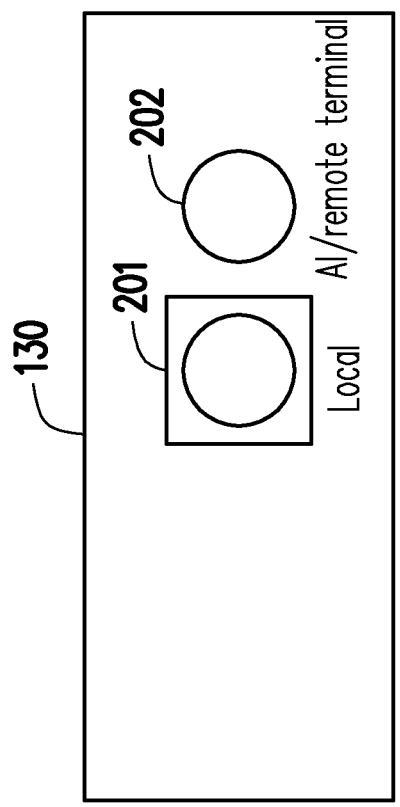
FIG. 2 is a schematic diagram of a control system according to an embodiment of the disclosure.

FIG. 2 is a schematic diagram of a control system according to an embodiment of the disclosure.

Please refer to FIG. 2. The device of the control system 130 may include a red button 201 (or referred to as a first button) and a green button 202 (or referred to as a second button). The red button 201 corresponds to a local terminal and green button corresponds to artificial intelligence and a remote terminal. When the virtual operator 131 of the control system 130 executes a script to generate the first control command, the light signal of the second button lights up and the control system 130 is accessible from a remote terminal. When the first button is pressed, the light signal of the first button lights up and the control system 130 stops executing the script, and the control system 130 is only accessible from the local terminal but not accessible from the remote terminal. When the control system 130 is not executing the script and the light signal of the first button lights up while the light signal of the second button does not light up, the control system 130 is only accessible from the local terminal but not accessible from the remote terminal.

For example, when the virtual operator 131 is executing an artificial intelligence script, the green light signal of the green button 202 lights up. If the physical management personnel 150 presses the red button 201 and the red light signal of the red button 201 lights up, the virtual operator 131 will stop executing the artificial intelligence script and set the local terminal as the highest priority. The Table 1 below is a table showing different states corresponding to the red and green light signals.

TABLE 1

| States | Local terminal | Remote terminal | Artificial intelligence | Red light signal | Green light signal |
| --- | --- | --- | --- | --- | --- |
| 1 | Accessible | Accessible | Not in operation | OFF | OFF |
| 2 | Not accessible | Accessible | In operation | OFF | ON |
| 3 | Accessible | Not accessible | Not in operation | ON | OFF |
| 4 | Accessible | Not accessible | Suspended | ON | ON |

TABLE 1-continued

Please refer to Table 1. In states 3 and 4, the red light signal is "ON", which means that accessing the control system 130 by the local terminal is set with the highest priority and the control system 130 is not accessible by the remote terminal. Under the circumstances, the green light signal is "OFF", which means that artificial intelligence is not running, and the green light signal is "ON", which means that artificial intelligence is suspended. In state 2, the red light signal is "OFF" and the green light signal is "ON", which means that the control system 130 is not accessible by the local terminal and is accessible by the remote terminal, and artificial intelligence is running. In state 1, the red and green light signals are both "OFF", which means that artificial intelligence is not running. Under the circumstances, the control system 130 is accessible by both the local terminal and the remote terminal.

Figure 3:
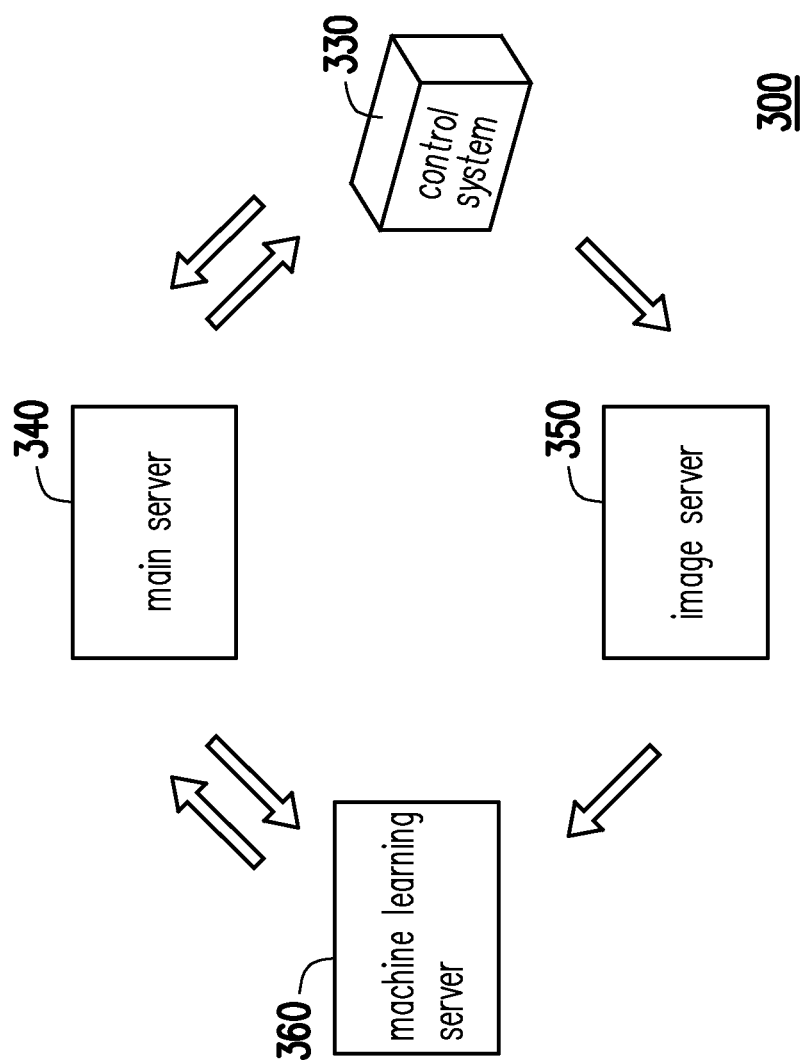
FIG. 3 is a block diagram of a factory management system according to an embodiment of the disclosure.

FIG. 3 is a block diagram of a factory management system according to an embodiment of the disclosure.

Please refer to FIG. 3. In an embodiment of the present disclosure, a factory management system 300 includes a control system 330, a main server 340, an image server 350 and a machine learning server 360. The main server 340 and the image server 350 are coupled to the control system 330 and the machine learning server 360 is coupled to the main server 340 and the image server 350. The control system 330 can be coupled to the factory computer host and collect production data from the factory computer host, and transmit production commands to the factory computer host. The image server 350 receives multiple real-time images from the control system 330, and the machine learning server 360 captures real-time images from the image server 350 at a predetermined time interval. The machine learning server 360 inputs the real-time images into a preset image recognition model for training and transmits the recognition rate to the main server 340. When the recognition rate is greater than the preset recognition rate, the main server 340 transmits the trained new image recognition model to the control system 330. When a new algorithm (for example, a new algorithm to detect a product defect) is released, the new algorithm may be input to the main server 340, and the main server 340 may transmit the new algorithm to the machine learning server 360. In addition, the status report of hardware or software of the control system 330 will be sent to the main server 340.

Figure 4:
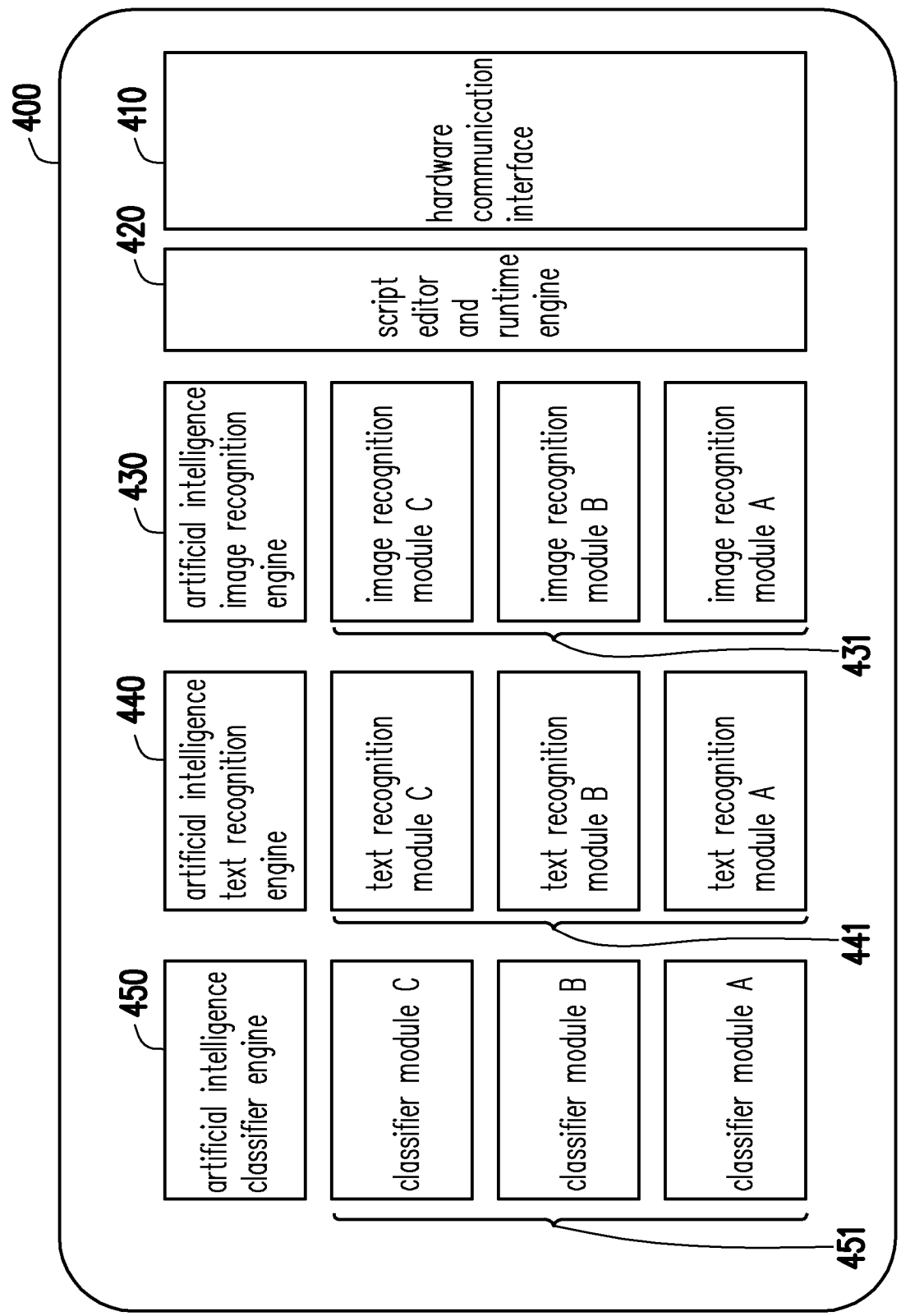
FIG. 4 is a block diagram of an artificial intelligence module of a control system according to an embodiment of the disclosure.

FIG. 4 is a block diagram of an artificial intelligence module of a control system according to an embodiment of the disclosure.

Please refer to FIG. 4 and FIG. 3. In an embodiment of the present disclosure, an artificial intelligence module 400 of the control system includes a hardware communication interface 410 as well as a script editor and runtime engine 420. The hardware communication interface 410 can receive production data such as image data or text data through hardware of the control system, and the artificial intelligence script is executed by the script editor and runtime engine 420 for data recognition. For example, an artificial intelligence image recognition engine 430 may perform image recognition according to a different image recognition module 431. An artificial intelligence text recognition engine 440 can perform text recognition according to a different text recognition module 441. An artificial intelligence classifier engine 450 can classify data according to a different classifier module 451. The classified data can be transmitted to the image server 350, and the artificial intelligence module 400 of the control system can receive the newly released recognition module or classification module from the main server 340.

Figure 5:
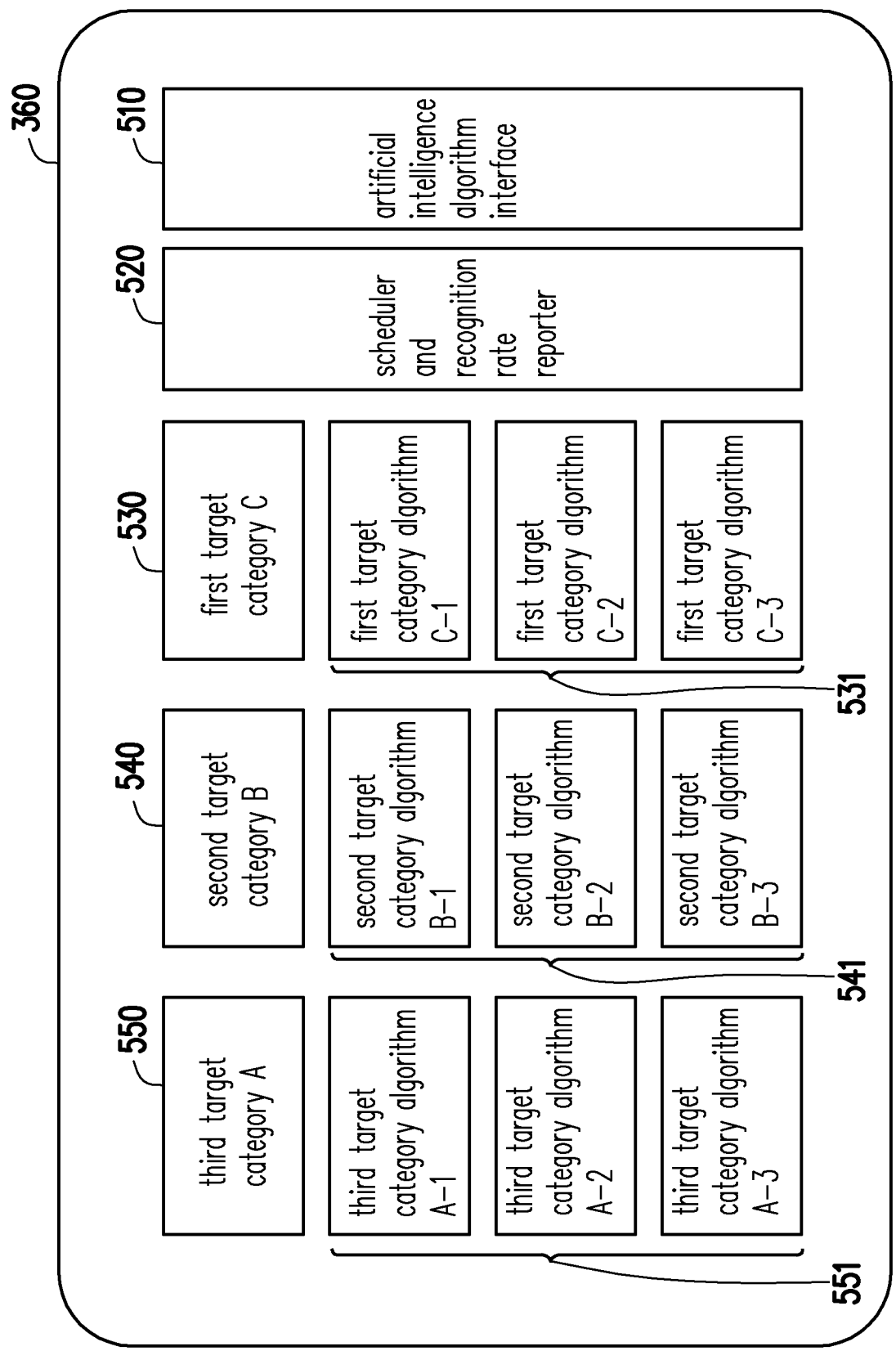
FIG. 5 is a block diagram of a machine learning server according to an embodiment of the present disclosure.

FIG. 5 is a block diagram of a machine learning server according to an embodiment of the present disclosure.

Please refer to FIG. 5 and FIG. 3. In an embodiment of the present disclosure, a machine learning server 360 includes an artificial intelligence algorithm interface 510 as well as a scheduler and recognition rate reporter 520. The artificial intelligence algorithm interface 510 can receive the newly released algorithm from the main server 340. The scheduler and recognition rate reporter 520 can arrange schedule for the machine learning program and send the recognition rate report to the main server 340. The machine learning server 360 further includes a first target category 530 and a corresponding first target category algorithm 531, a second target category 540 and a corresponding second target category algorithm 541, a third target category 550 and a corresponding third target category algorithm 551. Different target categories correspond to different machine learning objects, such as recognition rate learning, image search learning or recognition speed learning, etc.

Figure 6:
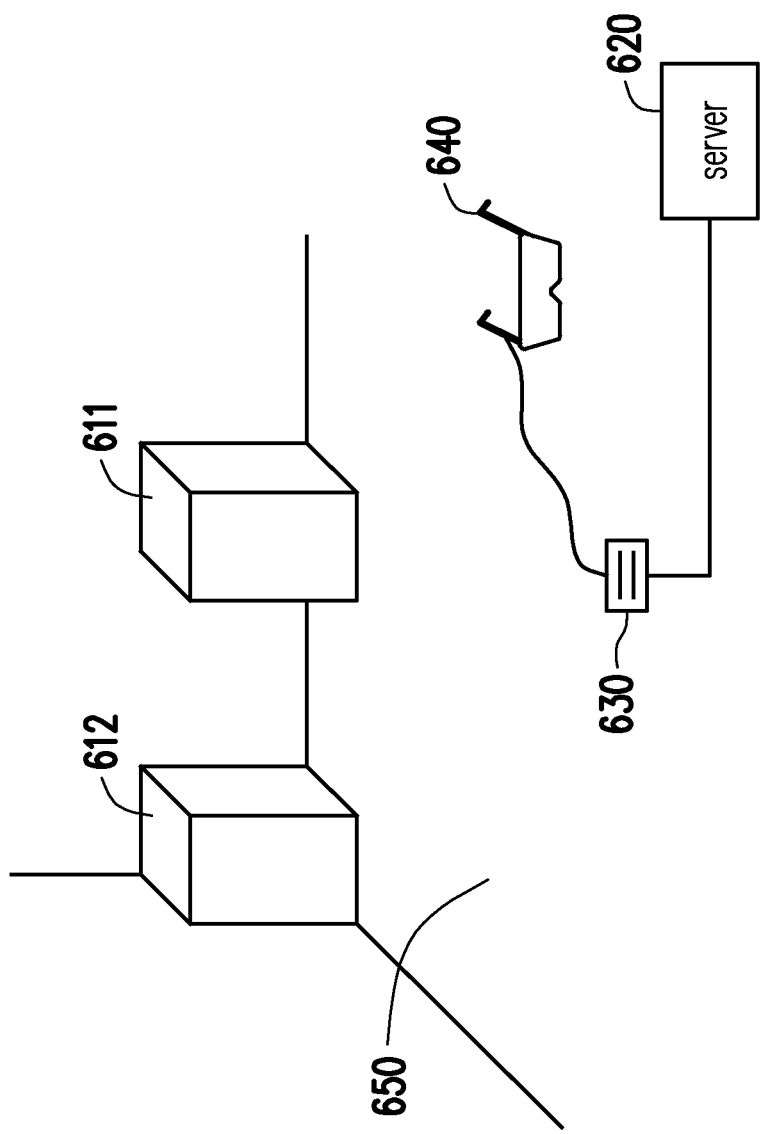
FIG. 6 is a schematic diagram of a factory management system according to an embodiment of the disclosure.
Figure 7:
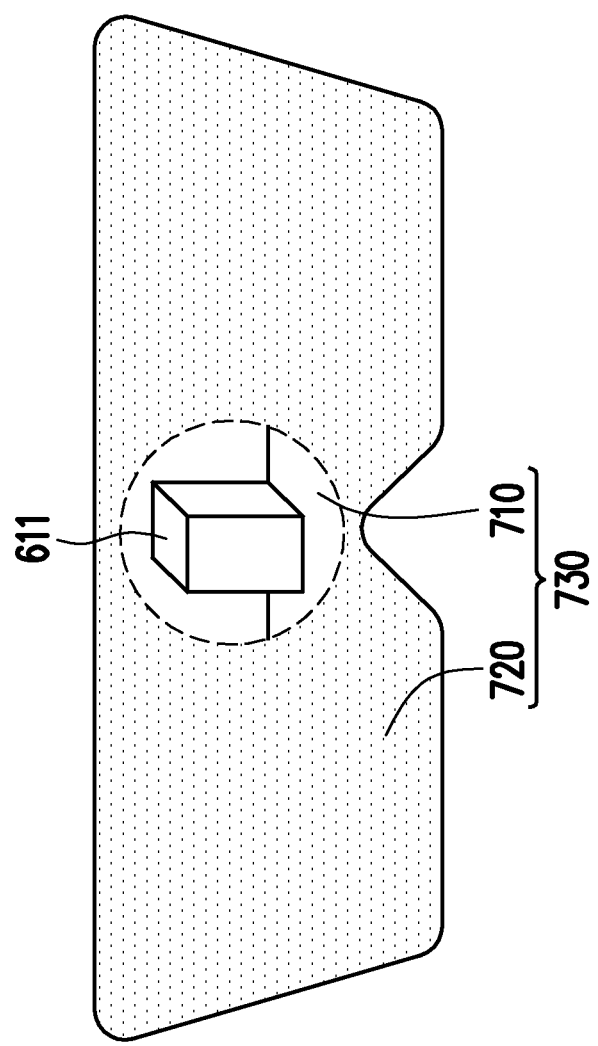
FIG. 7 is a schematic diagram showing a limited field of view in a factory according to an embodiment of the present disclosure.

FIG. 6 is a schematic diagram of a factory management system according to an embodiment of the disclosure. FIG. 7 is a schematic diagram showing a limited field of view in a factory according to an embodiment of the present disclosure.

Please refer to FIGS. 6 and 7. In an embodiment of the present disclosure, a factory management system 600 includes a machine 611, a machine 612 (or more machines), a server 620, a plug 630, and a head-mounted device 640. The plug 630 is coupled to the server 620, and the plug 630 is located in a space 650 together with the machine 611 and the machine 612. The plug 630 may include a universal serial bus type C (USB type-C) interface or other communication interface for audio and video data transmission. The head-mounted device 640 is coupled to the plug 630 through a connection line, and the length of the connection line is less than a predetermined length (for example, less than 3 meters) and is retractable. The head-mounted device 640 is, for example, an augmented reality (AR) device or a virtual reality (VR) device. The head-mounted device 640 displays a real-time image 730 corresponding to the space 650. The real-time image 730 includes a visible region 710 and an invisible region 720, and the visible region 710 includes a machine 611. The server 620 can transmit the real-time image 730 to the remote computer (not shown in the figure). The head-mounted device 640 may further include an image sensor and a lens corresponding to the image sensor, and the visible region 710 includes a spatial image within the focal length of the lens (for example, within one meter), and the server 620 performs a blurring process, a blackening process or other types of masking process on the invisible region 720. The head-mounted device 640 may further include a microphone and a speaker, and the head-mounted device 640 performs audio transmission with a remote computer through the microphone and the speaker. It should be noted that the audio and video transmission between the head-mounted device 640 and the remote computer can be accomplished through audio and video encoding (for example, H.264).

For example, when on-site repairer wants to enter a specific region of the factory (for example, a clean room) to repair the machine 611 and need the assistance of remote personnel (for example, the OEM mechanic technician of the machine 611), the repairer and remote personnel can confirm identity on the server 620. After the repairer enters the space 650 where the machine 611 is located, he/she can insert the connection line of the head-mounted device 640 into the plug 630 and put on the head-mounted device 640. The head-mounted device 640 displays the real-time image 730 and the server 620 can transmit the real-time image 730 to the remote personnel, so that the remote personnel can communicate with the repairer through video and audio communication. Therefore, both of the repairer and the remote personnel wearing the head-mounted device 640 cannot see the object (for example, machine 612) in the invisible region 720. In an embodiment, the server 620 may utilize the appearance of different machines or the features on the machine in the space 650 to perform machine recognition training in advance. When the image sensor on the head-mounted device 640 transmits the spatial image of the space 650 to the server 620, the server 620 can recognize the specific machine (for example, the machine 611) and transmit the real-time image 730, in which other objects excluding the machine 611 are shielded, to the head-mounted device 640 for display. In another embodiment, the server 620 can also obtain the position and direction of the head-mounted device 640 in the space 650, and make a judgment on the invisible region 720 according to the three-dimensional information of various objects in the space 650. This disclosure provides no limitation to the way of judging the invisible region 720.

In summary, the factory management system and the control system in the disclosure can continuously receive the second sensing data when the user logs into the control system to allow the user to transmit a user command. If the control system determines that an abnormal condition has occurred in the user login status, the control system will also send a warning message. Therefore, the factory management system and the control system in this disclosure will not interrupt the production process and the transmission of related data when the user logs into the control system, which will greatly improve the flexibility and efficiency of the factory automation management system.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:
1. A factory management system, comprising:
a machine;
a plurality of sensors, disposed corresponding to the machine and generating a plurality of first sensing data;
a server; and
a control system, coupled to the machine and the server, wherein
the control system receives the first sensing data to generate a plurality of corresponding first control commands in real time, and transmits the plurality of first control commands to the machine,
the control system receives a user login message, and receives a plurality of second sensing data and displays the plurality of second sensing data in a user login status, the control system receives a user control command, and transmits a second control command corresponding to the user control command to the machine, when the control system determines that an abnormal condition occurs according to the plurality of second sensing data in the user login status, the control system sends a warning message, wherein the control system determines a user authority corresponding to the user login message, and determines a maximum risk value corresponding to the user authority according to an authority and risk look-up table, when a risk value corresponding to the user control command is not greater than the maximum risk value, the control system transmits the second control command corresponding to the user control command to the machine.

2. The factory management system according to claim 1, wherein the server transmits an algorithm to the control system, and the control system generates the plurality of first control commands according to the plurality of first sensing data and the algorithm.

3. The factory management system according to claim 1, wherein the user login message is generated according to at least one button, a radio frequency identification reader, or a keyboard.

4. The factory management system according to claim 1, wherein the plurality of first sensing data and the plurality of second sensing data comprise at least one of an image sensing data, a pressure sensing data, a temperature sensing data, a traffic sensing data, a gas concentration sensing data, and a gas detection sensing data.

5. The factory management system according to claim 1, wherein the control system comprises a first button and a second button corresponding to different light signals, and the control system receives the user control command from a local terminal or a remote terminal.

6. The factory management system according to claim 5, wherein when the control system executes a script to generate the plurality of first control commands, a light signal of the second button lights up and the control system can be accessed from the remote terminal, when the first button is pressed, a light signal of the first button lights up and the control system stops executing the script, and the control system can only be accessed from the local terminal but cannot be accessed from the remote terminal.

7. The factory management system according to claim 6, wherein when the control system does not execute the script and the light signal of the first button lights up and the light signal of the second button does not light up, the control system is only accessible from the local terminal but not accessible from the remote terminal.

8. The factory management system according to claim 1, wherein the server comprises a main server, an image server, and a machine learning server, and the main server and the image server are coupled to the control system, and the machine learning server is coupled to the main server and the image server, the image server receives a plurality of real-time images from the control system, and the machine learning server captures the plurality of real-time images from the image server at a predetermined time interval.

9. The factory management system according to claim 8, wherein the machine learning server inputs the plurality of real-time images into a predetermined image recognition model for training and transmits a recognition rate to the main server, when the recognition rate is greater than a predetermined recognition rate, the main server transmits a trained new image recognition model to the control system.

10. The factory management system according to claim 1, further comprising:
a plug, coupled to the server, and the plug and the machine are located in a space; and
a head-mounted device, coupled to the plug through a connecting line, wherein
the head-mounted device displays a real-time image corresponding to the space, the real-time image comprises at least one of a visible region and an invisible region, and the visible region comprises the machine,
the server transmits the real-time image to a remote computer.

11. The factory management system according to claim 10, wherein the head-mounted device comprises an image sensor and a lens corresponding to the image sensor, and the visible region comprises a spatial image within the focal length of the lens, and the server performs a masking process on the invisible region.

12. The factory management system according to claim 10, wherein the head-mounted device comprises a microphone and a speaker, and the head-mounted device performs an audio transmission with the remote computer through the microphone and the speaker.

13. The factory management system according to claim 1, wherein the control system receives a third sensing data from a first sensor, divides the third sensing data into a plurality of data segments and calculates a single value corresponding to each of the data segments, if a deviation of one of the single values is greater than a threshold value, the control system sends a first warning message.

14. The factory management system according to claim 13, wherein the single value comprises at least one of an average value, a maximum value, a minimum value, and a peak frequency.

15. A control system, coupled to a machine and a server, the control system comprising:
an artificial intelligence module, wherein
the artificial intelligence module receives a plurality of first sensing data to generate a plurality of corresponding first control commands in real time, and transmits the plurality of first control commands to the machine,
the artificial intelligence module receives a user login message, and receives a plurality of second sensing data and displays the plurality of second sensing data in a user login state,
the artificial intelligence module receives a user control command, and transmits a second control command corresponding to the user control command to the machine,
when the artificial intelligence module determines that an abnormal condition occurs according to the plurality of second sensing data in the user login state, the artificial intelligence module sends a warning message, wherein the artificial intelligence module determines a user authority corresponding to the user login message, and determines a maximum risk value corresponding to the user authority according to an authority and risk look-up table, when a risk value corresponding to the user control command is not greater than the maximum risk value, the artificial intelligence module transmits the second control command corresponding to the user control command to the machine.

16. The control system according to claim 15, wherein the server transmits an algorithm to the artificial intelligence module, and the artificial intelligence module generates the plurality of first control commands according to the plurality of first sensing data and the algorithm.

17. The control system according to claim 15, wherein the user login message is generated according to at least one button, a radio frequency identification reader, or a keyboard.

18. The control system according to claim 15, wherein the plurality of first sensing data and the plurality of second sensing data comprise at least one of an image sensing data, a pressure sensing data, a temperature sensing data, a traffic sensing data, a gas concentration sensing data, and a gas detection sensing data.

19. The control system according to claim 15, further comprising a first button and a second button corresponding to different light signals, and the artificial intelligence module receives the user control command from a local terminal or a remote terminal.

20. The control system according to claim 19, wherein when the artificial intelligence module executes a script to generate the plurality of first control commands, a light signal of the second button lights up and the artificial intelligence module can be accessed from the remote terminal, when the first button is pressed, a light signal of the first button lights up and the artificial intelligence module stops executing the script, and the artificial intelligence module can only be accessed from the local terminal but cannot be accessed from the remote terminal.

21. The control system according to claim 20, wherein when the artificial intelligence module does not execute the script and the light signal of the first button lights up and the light signal of the second button does not light up, the artificial intelligence module is only accessible from the local terminal but not accessible from the remote terminal.

22. The control system according to claim 15, wherein the artificial intelligence module transmits a real-time image to an image server.

23. The control system according to claim 15, wherein the artificial intelligence module receives a trained new image recognition model from a main server.

* * * * *